United States Patent [19]
Kashyap

[11] Patent Number: 6,104,852
[45] Date of Patent: Aug. 15, 2000

[54] OPTICAL WAVEGUIDE WITH PHOTOSENSITIVE REFRACTIVE INDEX CLADDING

[75] Inventor: Raman Kashyap, Suffolk, United Kingdom

[73] Assignee: British Telecommunications public limited company, London, United Kingdom

[21] Appl. No.: 09/029,841

[22] PCT Filed: Jan. 17, 1997

[86] PCT No.: PCT/GB97/00128

§ 371 Date: Mar. 9, 1998

§ 102(e) Date: Mar. 9, 1998

[87] PCT Pub. No.: WO97/26571

PCT Pub. Date: Jul. 24, 1997

[30] Foreign Application Priority Data

Jan. 18, 1996 [EP] European Pat. Off. .............. 96300394

[51] Int. Cl.⁷ ...................................... G02B 6/16
[52] U.S. Cl. .............................. 385/123; 385/37; 385/122
[58] Field of Search ..................... 385/37, 122, 123–128, 385/141–145

[56] References Cited

U.S. PATENT DOCUMENTS

| | | | |
|---|---|---|---|
| 4,618,211 | 10/1986 | Fleury | 385/48 |
| 4,740,951 | 4/1988 | Lizet et al. | 359/130 |
| 4,820,018 | 4/1989 | Melman et al. | 385/127 |
| 4,974,930 | 12/1990 | Blyler, Jr. et al. | 385/28 |
| 5,013,115 | 5/1991 | Kashyap | 385/122 X |
| 5,210,801 | 5/1993 | Fournier et al. | 385/14 |
| 5,237,576 | 8/1993 | DiGiovanni et al. | 372/6 |
| 5,416,863 | 5/1995 | Vengsarkar | 385/28 |
| 5,620,495 | 4/1997 | Aspell et al. | 385/123 X |
| 5,633,966 | 5/1997 | Nakaishi | 385/37 |
| 5,647,039 | 7/1997 | Judkins et al. | 385/37 |
| 5,647,040 | 7/1997 | Modavis et al. | 385/123 X |
| 5,805,751 | 9/1998 | Kewitsch et al. | 385/37 X |
| 5,881,197 | 3/1999 | Dong et al. | 385/127 |
| 6,009,222 | 12/1999 | Dong et al. | 385/127 |

FOREIGN PATENT DOCUMENTS

| | | |
|---|---|---|
| 0 668 514 A2 | 8/1995 | European Pat. Off. . |
| 55-110207 | 8/1980 | Japan . |
| 60-200208 | 10/1985 | Japan . |
| 2017331 | 10/1979 | United Kingdom . |
| WO 86/01303 | 2/1986 | WIPO . |
| WO 90/08973 | 8/1990 | WIPO . |
| WO94/00784 | 1/1994 | WIPO . |
| WO 96/10282 | 4/1996 | WIPO . |

OTHER PUBLICATIONS

Conference On Optical Fiber Communication, Technical Digest Series, vol. 8, Feb. 26, 1995–Mar. 3, 1995, San Diego, pp. 343–346, Delevaque, "Optical fiber design for strong gratings photoimprinting with radiation mode suppression".

OFC, Optical Fiber Communication Conference Technical Digest Series, vol. 4, Feb. 20, 1994, p. 48/49, Vengsarkar et al., "Adiabatic Mode–Field Transformers Based On Photo–Induced Refractive–Index Changes in Hydrogen–Loaded Germanosilicate Fibers".

(List continued on next page.)

*Primary Examiner*—John D. Lee
*Attorney, Agent, or Firm*—Nixon & Vanderhye P.C.

[57] ABSTRACT

An optical fibre in a core and a cladding that includes an inner cladding region with a refractive index that is photosensitive to UV light, surrounded by a non-photosensitive outer cladding region. Refractive index gratings can be written into the cladding region. Also, the refractive index of the inner region can be altered by exposure to UV light to achieve mode matching at a splice between fibres with different core diameters. An optical fibre laser is disclosed with integral refractive index gratings in the cladding of a fibre with an optically active core.

26 Claims, 8 Drawing Sheets

OTHER PUBLICATIONS

Williams et al, "Enhanced UV Photosensitivity in Boron Codoped Germanosilicate Fibres", Electronics Letters, vol. 29, No. 1, Jan. 7, 1993, pp. 45–47.

Meltz et al, "Bragg Grating Formation and Germanosilicate Fiber Photosensitivity", SPIE, vol. 1516, International Workshop on Photoinduced Self–Organization Effects in Optical Fiber (1991), pp. 185–199.

Patent Abstracts of Japan, Publication No. JP55040477, Mar. 21, 1980, Production of Diffraction Grating Abstract.

Electronics Letters, vol. 27, No. 21, Oct. 10, 1991, Stevenage, Herts., G.B., pp. 1945–1947, "Formation of Moire Grating in Core of Germanosilicate Fibre by Transverse Holographic Double Exposure Method".

Database WPIL, Week 8739, 1987, Derwent Publications Ltd., & JP A 62 189 407 (Agency of Ind. Sci. Tech.), Aug. 19, 1987, "Light Waveguide Manufacture Heat Treat Polish Glass Coating Silicon Baseplate Thermal Oxidation Film".

Soviet Inventions Illustrated, Section CH. Week 8309, Apr. 13, 1983.

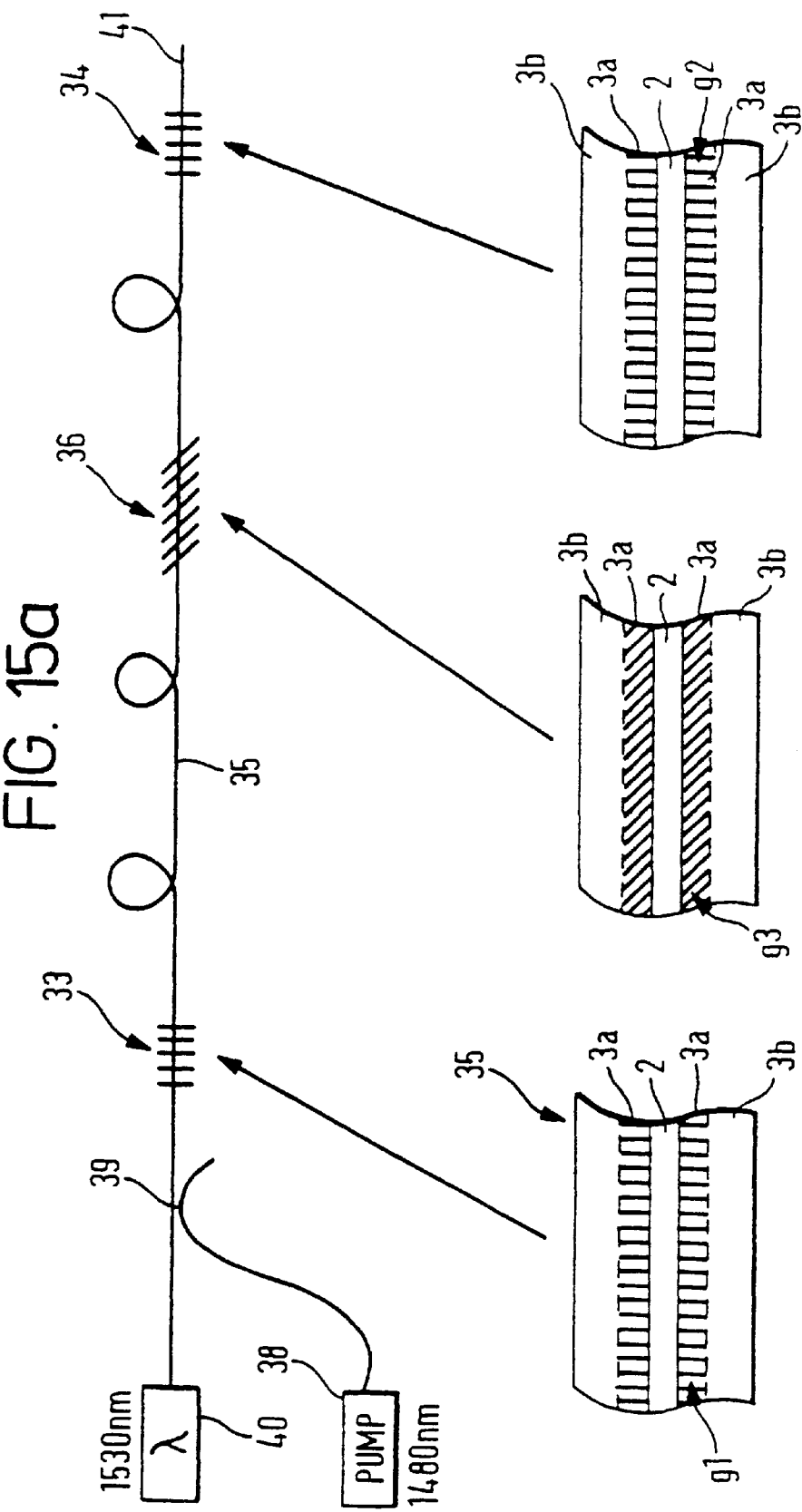

OPTICAL WAVEGUIDE WITH PHOTOSENSITIVE REFRACTIVE INDEX CLADDING

FIELD OF THE INVENTION

This invention relates to an optical waveguide that has a photosensitive refractive index, and has particular but not exclusive application to optical fibres.

BACKGROUND

It is well known that a germanium doped silica fibre exhibits photosensitivity, so that the refractive index of the core of the fibre changes when exposed to blue-green light, as demonstrated by Hill et al "Photosensitivity in Optical Waveguides; Application to Reflection Filter Fabrication" Applied Physics Letters Vol. 32 No. 10, 647 (1978). It was later shown that even stronger effects occurred if the core was exposed to ultra-violet radiation close to the absorption peak of a germania-related defect at a wavelength of 240 nm. Reference is directed to G. Meltz et al "Formation of Bragg Gratings in Optical Fibres by Transverse Holographic Method" Opt. Lett. Vol. 14, No. 15 823 (1989). The photosensitive phenomenon is not restricted to germania alone; cerium, europium and erbium: germanium have all shown varying degrees of sensitivity in a silica host optical fibre, but none has been as sensitive of germania. Germanium-boron codoping has also proved highly successful producing large index modulations of the core, of the order of $10^{-3}$ and reference is directed to Y. Duval et al, "Correlation between Ultra-violet-induced Refractive Index Change and Photoluminance is Gedoped Fibre" Applied Physics Letters, Vol. 61, No. 25, 2955 (1992).

Furthermore, it has been reported that the photosensitivity can be enhanced by hot hydrogen treatment of optical fibres. Reference is directed to G. Meltz et al, "Bragg Grating Formation and Germanio Silicate Fibre Photosensitivity" International Workshop of Photo Induced Self-Orgisation Effects in Optical Fibres SPIE Vol. 1516, p185 (1991). Conventionally, optical fibres are formed by taking a glass tube and exposing the interior thereof to a dopant gas, so as to form a dopant deposit on the interior surface thereof. Thereafter, the glass tube is heated and sintered so as to collapse its interior with the result that the dopant forms a core region through the centre. The effect of the dopant is to raise the refractive index of the central or core region and leave a surrounding cladding region of the lower refractive index. The resulting, collapsed, glass tube is then drawn to produce a fine optical fibre, of reduced diameter~120 $\mu$m, with a core surrounded by cladding. In a conventional manner, the difference $\Delta n$ between the refractive indices of the cladding $n_1$ and the core $n_2$ causes light to be guided along the core.

In conventional photosensitive optical fibres, i.e. fibres which have a photosensitive core, it is possible to record so-called refractive index Bragg gratings in the fibres and for a general review, reference is directed to "Photosensitive Optical Fibres: Devices and Applications" Kashyap et al, Optical Fibre Technology 1, 17–34 (1994). In a method described in EP-A-0 668 514, the cladding is rendered photosensitive as well as the core, so that the refractive index grating is recorded in both the core and, to an extent, in the cladding. Also, reference is directed to "Optical fiber design for strong gratings photoimprinting with radiation mode suppression" E. Delevaque et al, Conference on Fiber Communication, Technical Digest Series, Vol 8, No 6, pp 343–346, which discloses an optical fibre with a photosensitive core and a photosensitive intermediate region between the core and the cladding. A refractive index grating is written into the core and the intermediate region, which results in suppression of cladding modes. Photosensitive regions around the fibre core have also been used hitherto for mode matching, as described in U.S. Pat. No. 5,416,863.

Refractive index gratings produced in optical fibres according to these prior recording methods can be used as narrow band reflective filters. One use of the reflective filter is to provide a fibre grating laser, as will now be explained.

It is known that when the core of a silica optical fibre is doped with certain rare earth elements such as erbium or ytterbium, the fibre exhibits optical activity and can be used as an amplifier. The fibre is pumped with optical radiation at a first wavelength so that optical radiation at a second, different wavelength is amplified when passed through the pumped fibre. Such a rare earth doped fibre can be used to provide a laser. The rare earth doped fibre is included in an optical cavity, defined at one end by a refractive index fibre grating formed as aforesaid, spliced to the erbium doped fibre.

It would be desirable to write refractive index gratings in the rare earth doped fibre itself, but this has proved difficult in practice. When the fibre is doped with rare earth elements in its core, the fibres usually have little or no germania therein, so that it is difficult to write gratings in such highly doped fibres, although it has been demonstrated and reference is directed to G. Meltz et al supra. In order to write gratings in rare earth doped fibres, they typically need to be treated with hydrogen. Typically, the fibres are additionally doped with aluminium or phosphorous in order to raise the refractive index of the core. Such fibres exhibit photosensitivity in the core at a wavelength in the region of 193 nm but the photosensitivity is limited as compared with the photosensitivity for a germanium or boron doped core, which exhibits photosensitivity at 244 nm.

SUMMARY OF THE INVENTION

In accordance with the present invention from a first aspect, there is provided an optical waveguide including core and cladding regions for guiding optical radiation, the core including optically nonstative material and the cladding region including material with a photosensitive refractive index. As used herein, the term "optically nonstative material" means optically active material which can be excited into states for producing optical amplification or a lasing action, or optically non-linear material that has a refractive index which varies transiently in a non-linear manner as a function of an applied electric ac or dc field or optical radiation e.g. but not limited to the Kerr effect, or poled material which has an electric dipole moment as a function of an applied electric field or optical radiation.

In accordance with the invention from a second aspect, the core of the waveguide includes material with a relatively non-photosensitive refractive index within a given wavelength range and the cladding region includes material with a relatively photosensitive refractive index within said wavelength range.

Thus, in accordance with the invention, a refractive index grating may be written in the cladding region of the optical waveguide even though the grating may be not written in the core region. It has been found that the transmission mode for radiation passing along the waveguide, extends sufficiently into the cladding region that a refractive index grating recorded therein, reflects the energy of optical radiation travelling along the waveguide, at an appropriate Bragg wavelength determined by the spatial periodicity of the refractive index grating.

In a further aspect, the invention provides an optical waveguide including core and cladding regions for guiding optical radiation, and a refractive index grating formed in the cladding region but not substantially in the core region.

The cladding material may include a cladding dopant which renders the refractive index of the cladding material photosensitive at least within a given wavelength range, and the core region may include a core dopant which renders the refractive index of the core material to be greater than that of the cladding material. Thus the photosensitivity characteristics of the cladding may be selected independently of the characteristics of the core.

The cladding dopant may include first and second different dopant materials'. which render the cladding material photosensitive and which respectively reduce and increase the refractive index thereof as a function of dopant concentration, whereby in the absence of exposure to light in said wavelength range, the refractive index of the cladding assumes a base level less than that of the core material, and upon exposure to light in said wavelength range the refractive index of the exposed material of the cladding region changes from said base level.

The first and second dopant materials for the cladding material may comprise Be and Ge, permitting the cladding to be rendered photosensitive at 244 nm, and permitting the cladding to have a lower refractive index than the core, so as to allow single mode operation of the waveguide.

The core material may include a dopant such as a rare earth element to render it optically active, e.g. for use in an amplifier or a laser. The rare earth dopant may comprise Er or Yb or Nd.

For prior art fibres doped with rare earths in their core, an additional dopant such as Al or P is typically included in order to raise the refractive index relative to the cladding. The high value of refractive index produced in the core enables the core diameter to be reduced as compared with a conventional silica optical fibre, whilst permitting single mode transmission to be achieved. The difference between the core diameter of the erbium doped fibre and a conventional fibre, however gives rise to difficulties when it is desired to splice them together. In accordance with the invention, the fibre is provided with a photosensitive refractive index cladding region, so that the cladding can be exposed to optical radiation so as to reduce its refractive index, thereby causing the transmission mode of the rare earth doped fibre to spread into the cladding. As a result, the configuration of the transmission mode in the rare earth doped fibre can be caused to spread transversely so as to correspond to the transmission mode configuration of the conventional silica fibre, which has a larger diameter core. In this way, transmission mode matching can be achieved.

The waveguides according to the invention may be spliced together and the core region of the waveguide according to the invention may have a transverse dimension which is less than the corresponding transverse dimension of the core region of the waveguide to which it is spliced, so that the alteration of the refractive index of the cladding material of the first waveguide spreads the mode of the first waveguide so as to correspond to that of the second waveguide.

The invention furthermore includes a splice when processed by this method.

The optical waveguide may comprise an optical fibre, such as a silica fibre, but may also comprise optical tracks on a substrate, defined by strips of photosensitive cladding material. The cladding material may be selectively exposed to optical radiation to change its refractive index so as to control optical connections between the tracks selectively.

BRIEF DESCRIPTION OF THE DRAWINGS

In order that the invention may be more fully understood, embodiments thereof will now be described by way of example with reference to the accompanying drawings in which:

FIG. 3 is a graph of the refractive index profile through the conventional fibre in the section shown in FIG. 2a;

FIG. 15a illustrates an optical fibre laser that includes an optical fibre in accordance with the invention;

FIGS. 15b, c and d illustrate refractive index gratings formed in the fibre shown in FIG. 15a;

FIG. 16c illustrates the wavelength response at the output of the laser shown in FIG. 15a;

DETAILED DESCRIPTION

Figure 1:
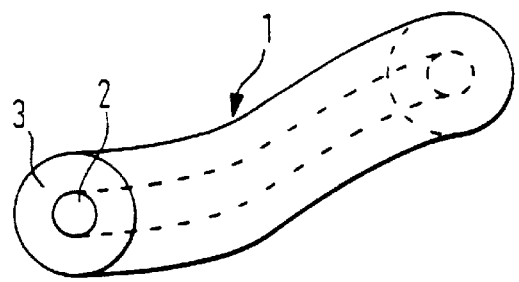
FIG. 1 is a perspective view of a length of conventional optical fibre.
Figure 2A:
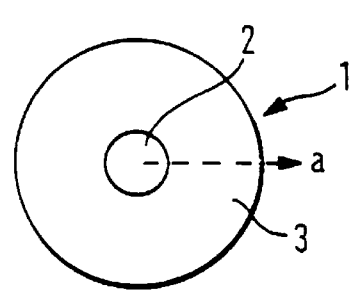
FIG. 2a is a transverse sectional view of the fibre shown in FIG. 1.
Figure 3:
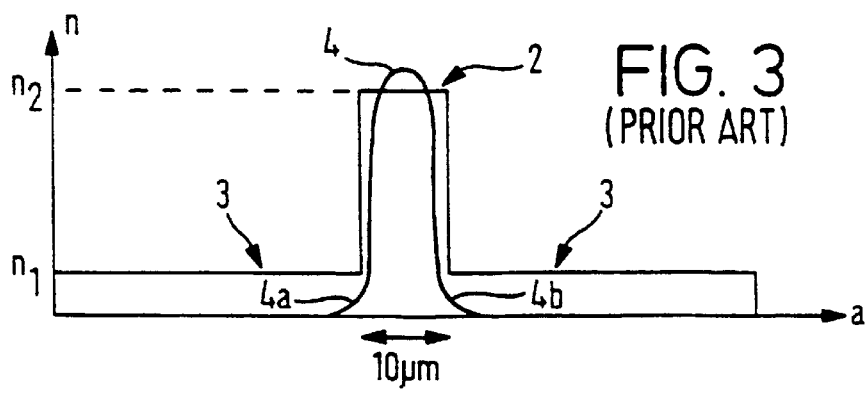

Referring to FIG. 1, this shows a conventional single mode optical fibre 1 made of silica which consists of a core region 2 doped so as to have a relatively high refractive index, surrounded by a cladding region 3 which has a relatively low refractive index. In a typical example, the core region 2 has a diameter of 8 –10 μm and the cladding region 3 has an outer diameter of 125 μm. A transverse cross-section through the fibre is shown in FIG. 2a and the corresponding variation in refractive index n in the direction a, across the diameter of the fibre, is shown in FIG. 3. The graph of FIG. 3 is somewhat idealised and illustrates a fibre with a refractive index $n_1$ in the cladding region and a refractive index $n_2$ in the region of the core. The value $\Delta n = n_2 - n_1$ is selected in order to cause optical radiation to be guided along the core, in a manner well known per se. Conventionally, the core region 2 may be doped with Al or P in a manner well known per se, in order to raise the value of $n_2$ relative to the refractive index $n_1$ of the surrounding silica cladding region 3. In a typical example of the prior art $n_1 = 1.454$ and $n_2 = 1.585$ If it is desired to write a refractive index grating in the fibre, a problem arises in that the Al or P doped core only exhibits a relatively low photosensitivity to ultra-violet light, at 193 nm, and hydrogen treatment may be required in order to achieve a desired level of photosensitivity. The core may alternatively be doped with Ge and/or B to achieve photosensitivity, which occurs at 244 nm. The effect of Ge dopant is to increase the refractive index of the core whereas the effect of B is to decrease the refractive index as a function of dopant density. Thus, it is possible to achieve co-doping so as to increase the photosensitivity without necessarily causing a substantial increase in overall refractive index.

Referring to FIG. 3, the transmission mode configuration 4 for light travelling along the waveguide is shown, which exhibits an amplitude peak in the centre of the core region and tails 4b which may extend into the cladding region 3.

When the core is doped with a rare earth element such as Yb or Er in order to achieve optical activity, a problem arises in that dopants such as Ge or B cannot be used satisfactorily in combination with the rare earth dopant in the core to achieve photosensitivity. It has been found that Ge or B produces instability in the rare earth doped core. Dopants such as Al or P can be used to increase the refractive index of the core but as previously explained, it is difficult to achieve satisfactory photosensitivity with these materials.

Figure 4:
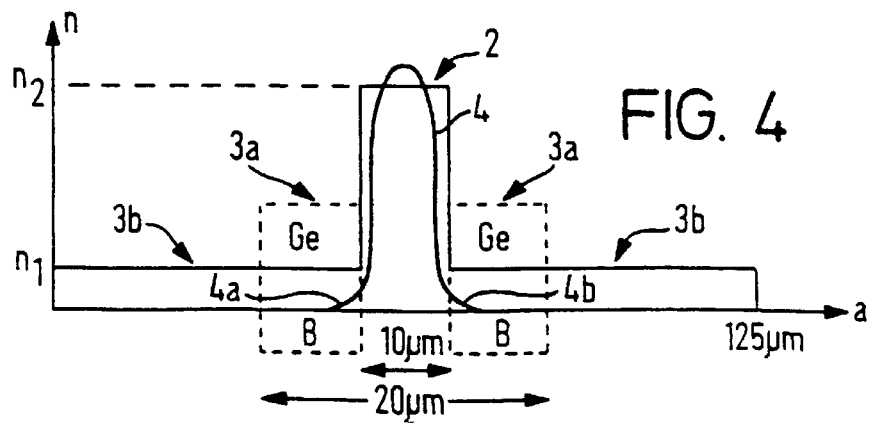
FIG. 4 is a graph of the refractive index profile through the optical fibre in accordance with the invention shown in FIG. 2b.

The present invention provides an alternative approach. In accordance with the invention, the cladding material of the fibre is rendered photosensitive. Referring to FIG. 4, this is a graph corresponding to FIG. 3, for the dopant concentration in a silica fibre in accordance with the invention. As shown in FIG. 4, the core 2 is doped with a relatively non-photosensitive dopant such as Al or P and may optionally include a rare earth element to render the core optically active, e.g. Er or Yb. As a result, the core has a refractive index $n_2$ of a relatively high value as compared with the refractive index $n_1$ of the cladding.

Figure 2B:
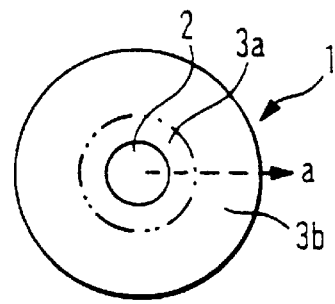
FIG. 2b is a transverse section through a fibre in accordance with the invention.

The cladding 3 is rendered photosensitive as a result of being doped with Ge and B in an inner region 3a that surrounds the core. The effect of the Ge dopant is to raise the refractive index for the inner cladding region 3a as a function of the concentration of the dopant, whereas the effect of the B dopant is to correspondingly reduce the refractive index of the inner cladding region. The respective dopant densities of Ge and B are selected so that the resultant refractive index assumes a value $n_1$ corresponding to the remaining outer region 3b of the cladding, which is undoped with Ge or B. The arrangement of the inner and outer cladding regions 3a, b is shown schematically in the section through the fibre shown in FIG. 2b. The $\Delta n$ value for the fibre shown in FIG. 4 can be the same or substantially similar to that of a conventional optical fibre, with the value of $n_1$ and $n_2$ being e.g. the same as shown in FIG. 3. If desired, the photosensitivity of the cladding region can be enhanced by cold pressure hydrogen treatment as described in P. Lemaire, R. M. Atkins, V. Mizrahi and W. A. Reed, "High pressure $H_2$ loading as a technique for achieving ultrahigh UV photosensitivity and thermal sensitivity in $GeO_2$ doped optical fibres" Electron. Lett., vol 29, no. 13, 1191 (1993) and P. J. Lemaire, A. M. Vengsarkar, W. A. Reed, V. Mizrahi and K. S. Kranz, "Refractive index changes in optical fibres sensitised with molecular hydrogen" in Proc. Conference on Optical Fiber Communications, OFC '94, Technical Digest, p 47, paper TuL1, 1994.

Figure 5:
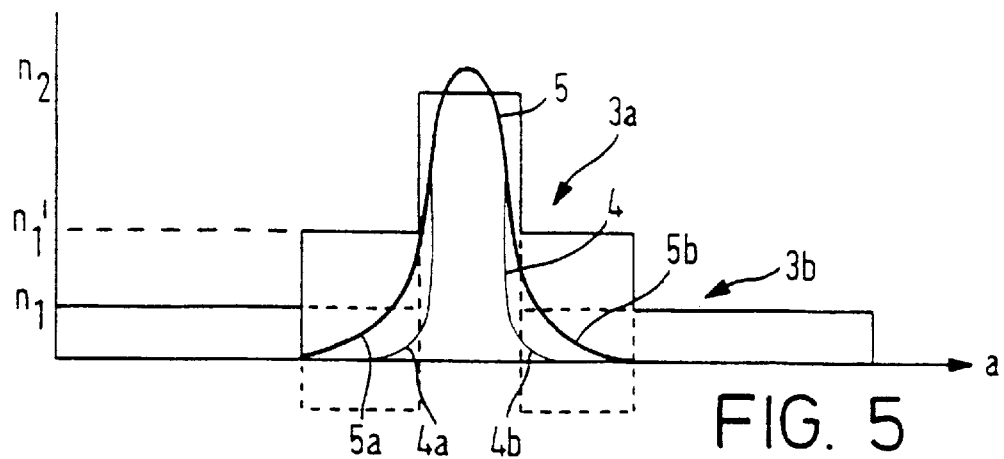
FIG. 5 is a graph corresponding to FIG. 4 showing the variation of the refractive index in the photosensitive cladding of the optical fibre according to the invention, showing the mode configuration for transmitted light.

The configuration shown in FIG. 4 illustrates the situation in which the fibre according to the invention has not yet been exposed to ultra-violet radiation. FIG. 5 shows the effect of incident ultra-violet radiation on the inner photosensitive cladding region 3a Radiation at a wavelength of 244 nm causes the refractive index of the cladding region 3a to increase, as shown, to a value $n_1'$ from the previous value of $n_1$, shown in dotted outline. The difference $\Delta n'$ between the refractive index $n_2$ and $n_1'$ that occurs after the u.v. exposure still permits guiding of light along the waveguide. The transmission mode configuration prior to exposure to u.v. light is shown in dotted outline 4 and corresponds to the prior art mode configuration shown in FIG. 3. The effect of the increase in $n_1$ due to the u.v exposure results in a spreading of the mode configuration into the cladding so as to produce mode configuration 5 with tails 5a, 5b which spread into the photosensitive cladding region 3a. In an example of the invention, the core 2 had an outer diameter of 10 μm, the region 3a had an outer diameter of 20 μm, and the region 3b of the cladding had an outer diameter of 125 μm. The refractive index of the core $n_2$ was 1.475, and the refractive index $n_1$ of the cladding prior to u.v. exposure was 1.454. After exposure, the value of the refractive index of the inner cladding region 3a changed to $n_1' = 1.464$.

The photosensitivity of the cladding 3 can be used to achieve a number of different effects. A refractive index grating can be recorded in the cladding, with the refractive index varying between values $n_1$ and $n_1'$ with a spatial periodicity $\Lambda$ along the length of the cladding. It has been found that because the tails 4b, 5b of the transmission mode configuration extend into the cladding, the mode interacts sufficiently with the spatial refractive index variations to produce Bragg reflection. The wavelength of the Bragg reflection is given by $\lambda_{Bragg} = 2 \Delta n_{eff} / N$, where $\Lambda$ is the period of the interference pattern and nff is the effective index of the guided mode. N is an integer and indicates the order of the interaction. In this case $n_{eff} \sim (n_2 + n_1)/2$.

Figure 6:
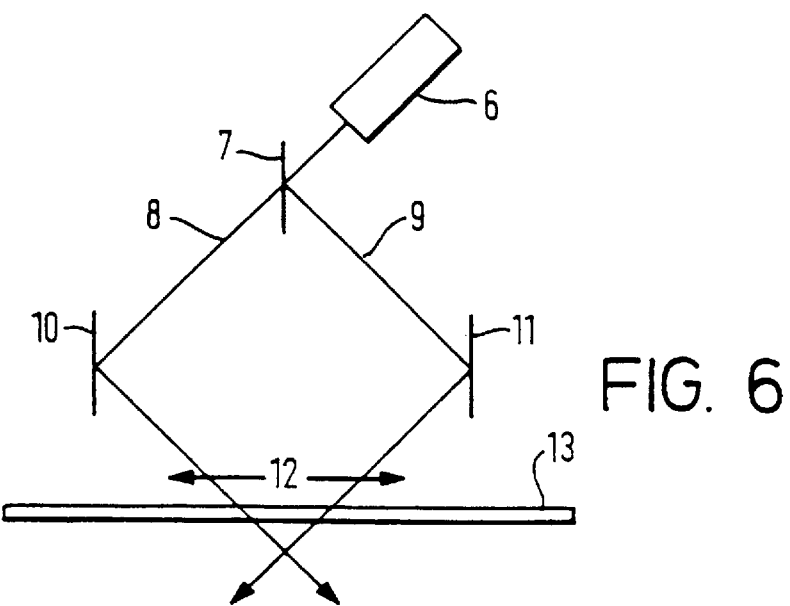
FIG. 6 is a schematic illustration of a refractive index recording method.
Figure 7:
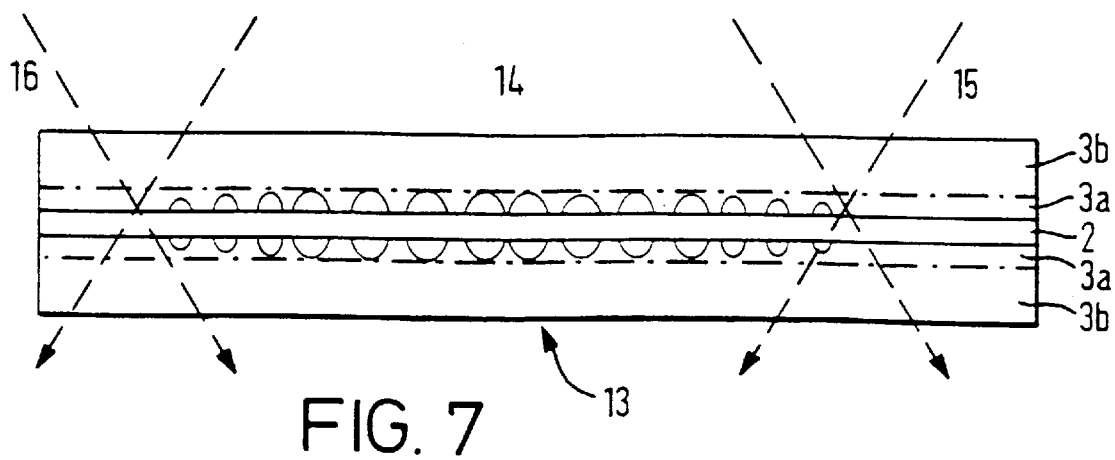
FIG. 7 is an illustration of a grating recorded in an optical fibre according to the invention, by the method.

The refractive index grating may be written in the fibre by any of a number of conventional techniques and for a general review, reference is directed Kashyap supra. One example will now be described with reference to FIG. 6 and 7. Ultra-violet light from a laser 6 at a wavelength of 244 nm is directed through a beam splitter 7 to form first and second coherent beams 8, 9 that are reflected by mirrors 10, 11, so as to interfere with one another and form an interference pattern in region 12 extending transversely along the length of an optical fibre 13 that has a photosensitive cladding as described with reference to FIGS. 4 and 5. As shown in more detail in FIG. 7, the interference pattern becomes recorded in the photosensitive cladding 3 of the fibre 13 with the result that a spatially periodic refractive index variation is produced in the cladding with a spatial periodicity Λ. The amplitude of the variation may vary from a peak in a central region 14 of the pattern and decrease towards the ends 15, 16 thereof. The pattern is not recorded in the core 2 of the fibre to any significant extent due to the fact that the core, typically doped with Al or P and optionally a rare earth element such as Yb or Er, is not substantially photosensitive to the incident light of wavelength 244 nm.

The fibre with its photosensitive inner cladding region may be manufactured by one of a number of conventional fabrication techniques. Generally, a preform is produced with the desired refractive index profile, which is then drawn to produce the fine fibre. Several methods can be used for the preform fabrication. The three commonly used methods are modified chemical vapour deposition (MCVD), outside vapour deposition (OVD) and vapour-phase axial deposition (VAD). Among the three, MCVD is the most widely employed and for a detailed review, reference is directed to Fundamentals of Fibre Optics in Telecommunications and Sensor Systems, editor P. B. Pal, Wiley Eastern Limited—Fabrication Techniques of Optical Fibres, H. Karstensen Ch. 9, pp 223–248.

An example of fabrication of the preform, using MCVD will now be described. For a detailed description of the apparatus used, reference is directed to Karstensen supra pp 233–239. Firstly, controlled amounts of $SiCl_4$, vapour as dopant, along with oxygen are fed into a rotating fused silica substrate tube. A traversing oxy-hydrogen burner heats a short zone of the tube to a temperature of about 1600° C. In this hot zone, the chemicals react forming glass particles which are subsequently deposited downstream on the inner wall of the tube. The heat from the slowly traversing burner which follows, sinters the deposited soot to form a transparent glass layer. The burner is then quickly returned to the other end of the tube and the process repeated so as to build up layers of material which eventually will form the exterior cladding region 3b of the previously described fibre in accordance with the invention.

Thereafter, dopant gases are introduced into the process and a mixture of P and F are introduced as dopants in successive layers. The effect of the P and F is respectively to increase and decrease the refractive index, and overall to reduce the melting point of the glass deposited.

Then, a mixture of gaseous $BCl_3$ and $GeCl_4$ is fed into the substrate tube, together with $SiCl_4$, so as to deposit glass which is co-doped with B and Ge. The resulting glass eventually forms the inner cladding layer 3a and has a refractive index which is the same as the outer cladding layer and is also photosensitive to u.v. light.

Thereafter, in order to form material for the fibre core, the flow rate of $GeCl_4$ is increased relative to $BCl_3$, whilst maintaining the flow rate of $SiCl_4$ the same. This deposits glass material with a higher refractive index than that of the cladding. If desired, Er dopant or similar rare earth materials can be introduced in order to render the eventual fibre core optically active.

The resulting structure is then sintered, so as to collapse the tube and produce the preform, from which the fibre can be drawn by conventional techniques.

Another application of the invention concerns radiation mode taps, also known as a side-tap filters. These can be formed by writing a slanted or so-called blazed grating into the core of the fibre. The grating couples light travelling along the fibre into a radiation mode, in which light is no longer guided in the core. Reference is directed to G. Meltz et al "In-Fibre Bragg Grating Tap" Proc. Conference on Optical Fibre Communications, OFC '90, Technical Digest p 24, paper TUG1, 1990. As described in this reference, blazed gratings written into a fibre result in outcoupling of light at visible wavelengths. By increasing the diameter of the core locally so as to provide a weakly guiding fibre, it is possible easily to overcome mode confinement due to the guidance of the fibre, over much narrower bandwidths, in order to produce the desired outcoupling of light from the fibre. However, there is a limitation to the narrowness of the band that can be produced. The present invention provides an alternative solution to increasing the core diameter locally.

Figure 8:
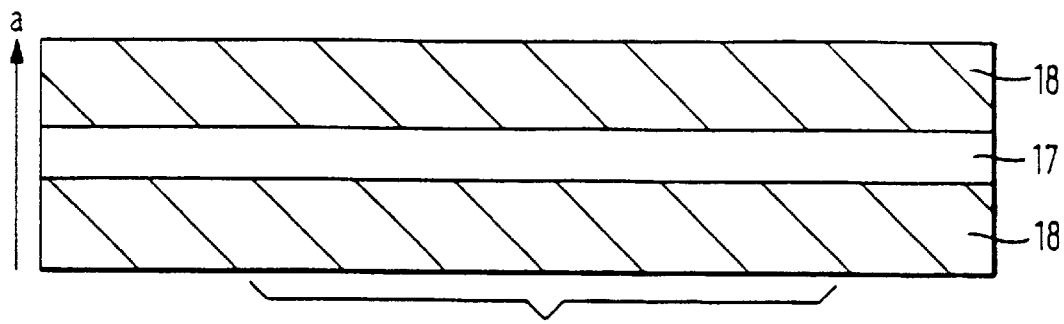
FIG. 8 is a schematic illustration of a blazed refractive index grating; recorded in both the core and cladding of an optical fibre, according to the invention.

Referring now to FIG. 8, there is shown an optical fibre 16 made of silica, with a core 17 and a surrounding cladding 18. The core is non-photosensitive and optically active, and the cladding is photosensitive, the fibre having been formed in the manner described with reference to FIG. 4.

Figure 9:
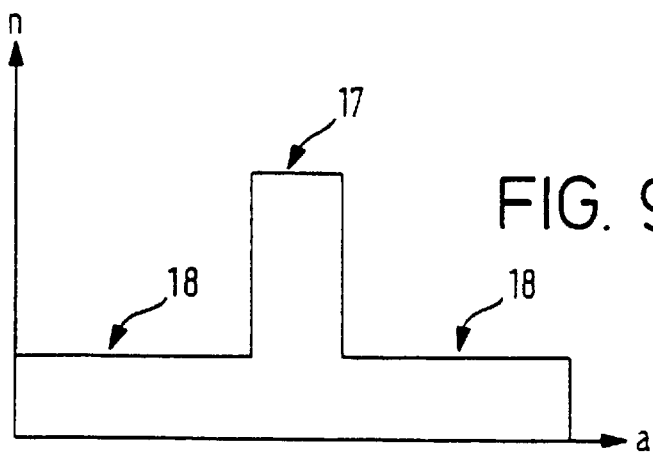
FIG. 9 is a graph of the refractive index profile of the fibre shown in FIG. 8, taken across a transverse section of the fibre.
Figure 17:
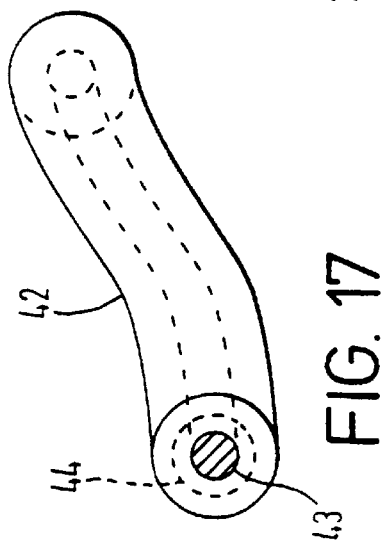
FIG. 17 is a schematic perspective view of another embodiment of waveguide according to the invention.
Figure 18:
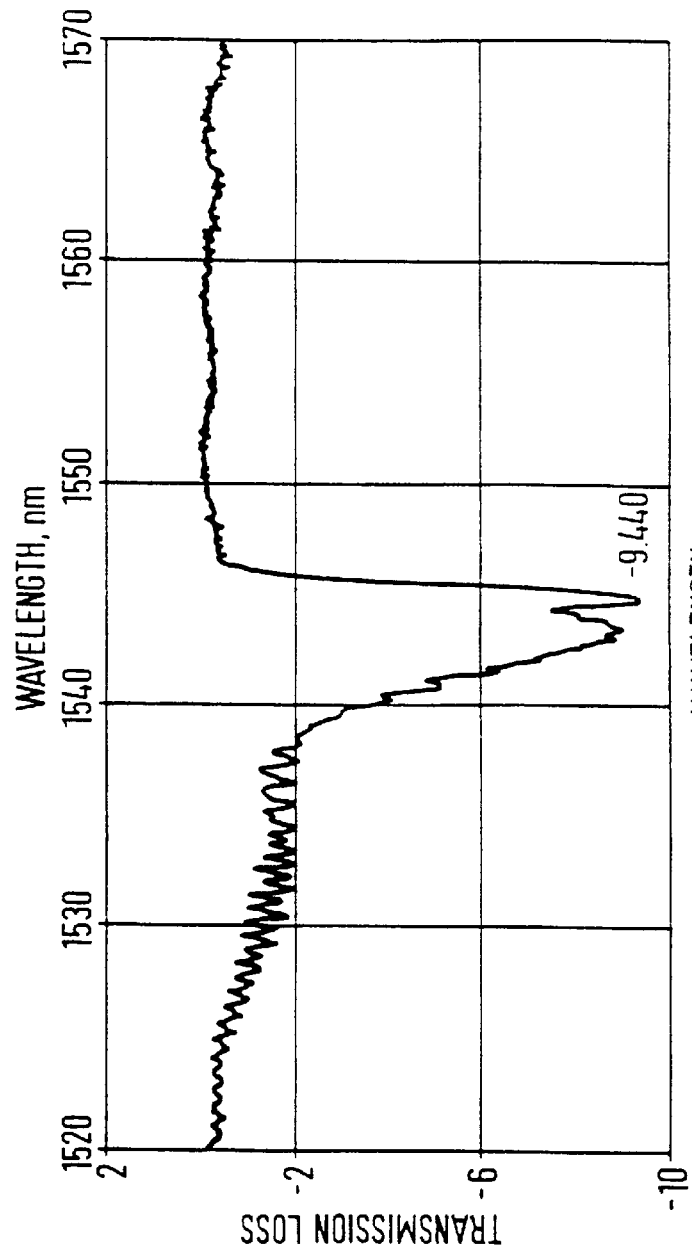
FIG. 18 is a graph of the transmission lost as a function of wavelength for light transmitted through a blazed grating as shown in FIG. 8.

A blazed refractive index grating 19 shown schematically, is written into the photosensitive cladding 18 of the fibre 16 in a manner known per se and described by Meltz et al supra. The core may be doped with Al or P and the cladding can be codoped with Ge and B to provide photosensitivity as previously described. A plot of refractive index n across the diameter of the fibre in direction a is shown in FIG. 9. The refractive index grating 19 is thus recorded substantially only in the cladding 18. The mode of light transmitted along the fibre 16 becomes enlarged beyond the core into the cladding and it can be shown that this produces a narrowing in the bandwidth of the filter characteristics. In one specific example, the fibre had a core diameter of 12 µm and an external cladding diameter of 125 µm giving a side tap bandwidth of approximately 15 nm at 1550 nm. It will be appreciated that conventional type-B fibres have a core diameter of the order of 8 µm so that the side tap filter can readily be spliced to conventional fibres without significant mode loss. Whilst in FIG. 8, the entire cladding is photosensitive, the cladding may in an alternative configuration, be formed as a photosensitive inner cladding, co-doped with Ge:B, matched to the refractive index of an outer cladding which is not photosensitive, as previously described with reference to FIG. 2b. A graph of the transmission loss obtained along a length of fibre, with a grating as shown in FIG. 8, as a function of wavelength is shown in FIG. 17.

As an alternative, unblazed long period gratings as described by A. N. Vengsarkar et al, "Long Period Fibre Gratings as Band Rejection Filters" OFC 95 paper PD4 San Diego Calif. 1995, could be formed by this technique.

The invention also has application to mode matching spliced fibres. For fibres with erbium doped cores, the core may be doped additionally with Al to achieve a high refractive index, in which case the core diameter can be reduced substantially whilst still transmitting in the single mode. Thus, the core diameter can be reduced to values such as 4 µm due to the increase in Δn between the core and the cladding resulting from the high dopant concentration in the core. Whilst such an arrangement is optically efficient, difficulties arise in splicing such a fibre, with a small diameter core, to a conventional fibre or a fibre as described with reference to FIG. 8, which includes a blazed grating, or to a conventional side tap filter which includes a blazed grating in a relatively weakly guiding fibre having an enlarged core diameter as described previously.

Figure 10:
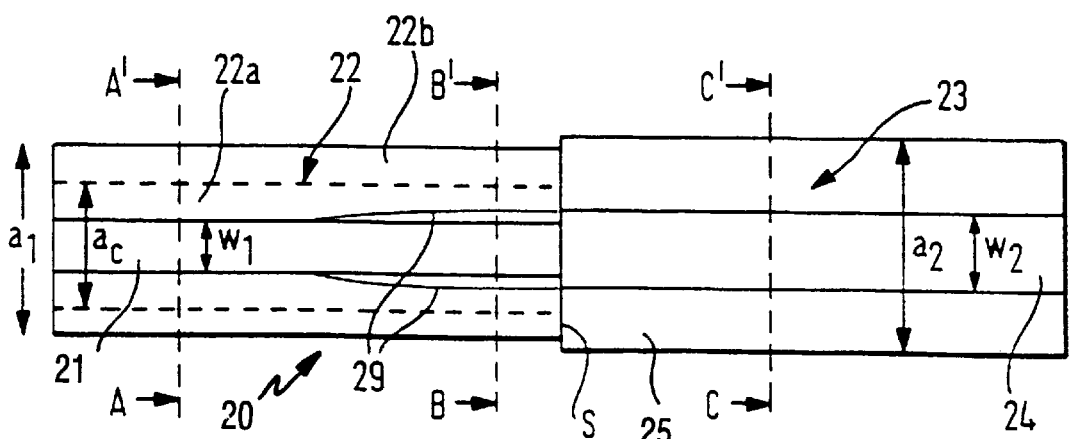
FIG. 10 is a schematic illustration of optical fibres spliced together, with different core diameters, with transmission mode configuration matching, FIGS. 11a, b and c are graphs of the refractive index profiles and the corresponding transmission modes, taken across transverse sections A–A', B–B' and C–C' of the spliced fibre arrangement shown in FIG. 10.

FIG. 10 shows a configuration which overcomes this problem. A first silica fibre 20 has a non-photosensitive Er doped core 21 surrounded by cladding material 22, which includes an inner photosensitive cladding region 22a surrounded by a non-photosensitive region 22b. The core 21 may additionally be doped with Al in order to increase its refractive index. As a result, the fibre is strongly guiding and the core diameter $w_1$ may be of a relatively small value e.g. 4 μm. The surrounding photosensitive cladding region 22a may be doped with Ge and Be as previously described with reference to FIGS. 4 and 5, and may have an external diameter $a_c$ of 16 μm.

The fibre 20 is spliced at S to a silica based fibre 23 that has a core 24 surrounded by cladding 25. The fibre 23 may be a conventional standard fibre as used in optical telecommunication system with a core diameter $w_2$ of 8 μm, i.e. significantly larger than the core diameter of fibre 20. The external diameter $a_2$ of the cladding 25 may be of a similar dimension to that of the fibre 22 of the order of 120 μm. However, as an alternative, the fibre 23 may have an enlarged core and include a blazed grating or may be as shown in FIG. 8.

Figure 11A:
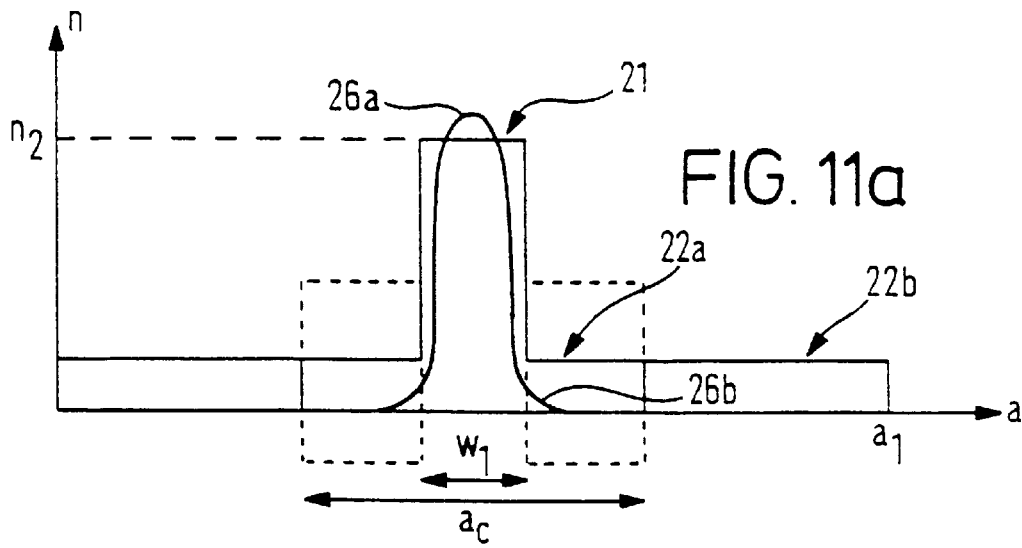

Referring now to the graphs shown in FIGS. 11a, b and c, the refractive index distribution across a transverse section of the fibre is shown for corresponding sections A–A', B–B' and C–C' respectively in FIG. 10. Considering FIG. 11a, it can be seen that the value of the refractive index of the core $n_2$ has a relatively high value in the Er:Al doped core region 21, whereas the photosensitive Ge:B cladding region 22a has not been exposed to u.v. radiation a relatively low refractive index $n_1$ corresponding to the refractive idea of the surrounding cladding region 22b.

Figure 11B:
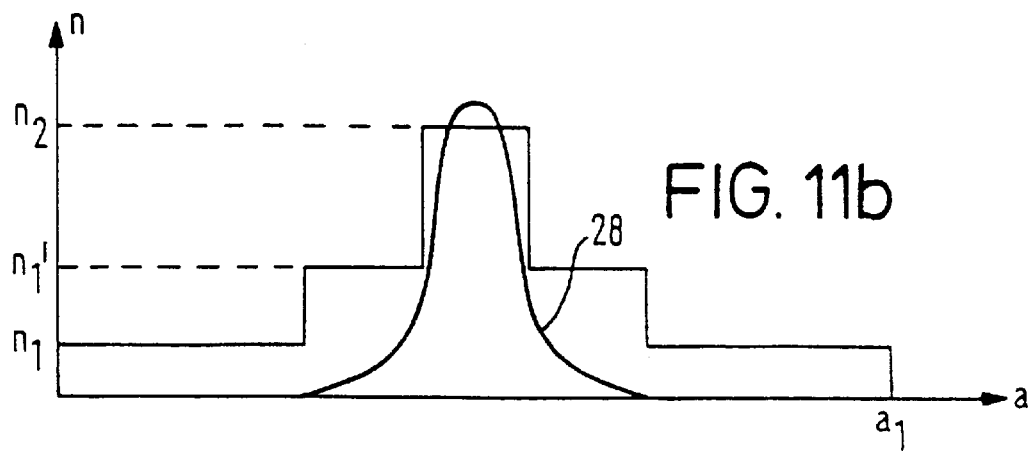
Figure 11C:
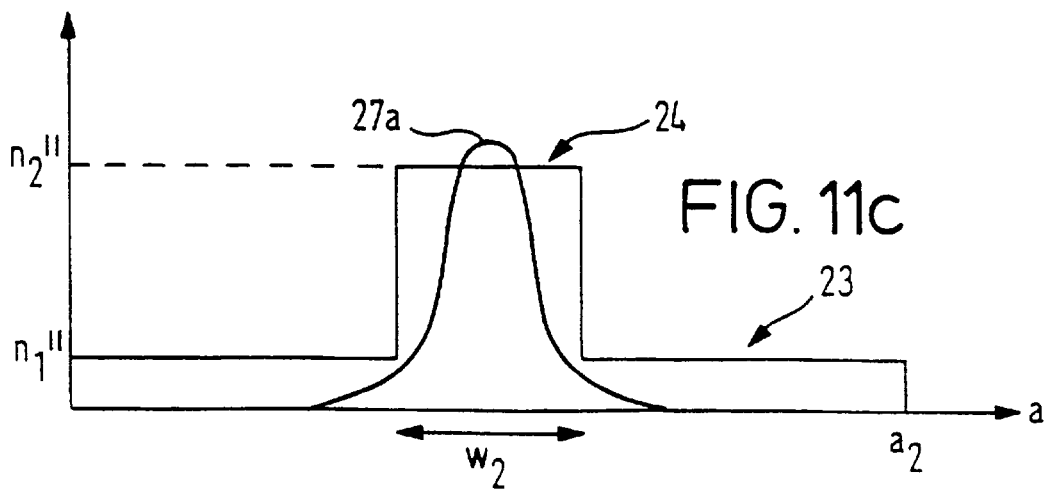

Referring to FIG. 11c, the core of the standard fibre 23 has a lower refractive index $n_2$" than the core of the fibre 20, and the core of fibre 23 has a larger diameter $w_2$ than the diameter $w_1$ of the core of fibre 20.

Referring to FIG. 11a again, the transmission mode configuration is shown at 26 and it will be seen that the mode has a relatively narrow configuration (as compared with FIG. 11c) with a relatively sharp peak 26a and relatively small tail 26b, which extends into the cladding. In contrast, in FIG. 11c, it can be seen that the transmission mode, shown at 27, is generally wider with a lower peak, 27a than the corresponding peak 26a in fibre 20. The difference between these two mode configurations can give rise to significant losses at the splice S between the two fibres.

In accordance with the invention, the splice is exposed to u.v. radiation so as to change the refractive index of the photosensitive cladding region 22a of fibre 20, in the region of the splice. In one specific example, the splice is exposed to radiation at 244 nm from a laser source (not shown) in order to alter the refractive index of the photosensitive Ge:B co-doped region 22a. This is shown in more detail in FIG. 11b from which it can be seen that the refractive index of the cladding 22 has altered from value $n_1$ FIG. 11a) to $n_1$'. The mode configuration 28, becomes wider and spreads out into the region of the cladding 22, as a result of the fibre becoming more weakly guiding to the mode, due to the decrease in value $\Delta n = n_2 - n_1'$, as compared with the configuration in FIG. 11a. Thus, in the region of the splice, the mode can spread out as shown in FIG. 11b, in the fibre 20 in order to correspond to the width of the mode configuration for fibre 23, shown in FIG. 11c. In this way, losses at the splice S are avoided. The progressive spreading of the mode is illustrated by lines 29 in FIG. 10. It will be understood that as an alternative, the value of the term Δn can be configured to increase. This has the effect of decreasing the width of the mode configuration for fibre 23. This can be useful in certain matching situations where it is necessary to reduce the diameter of the mode.

Figure 12:
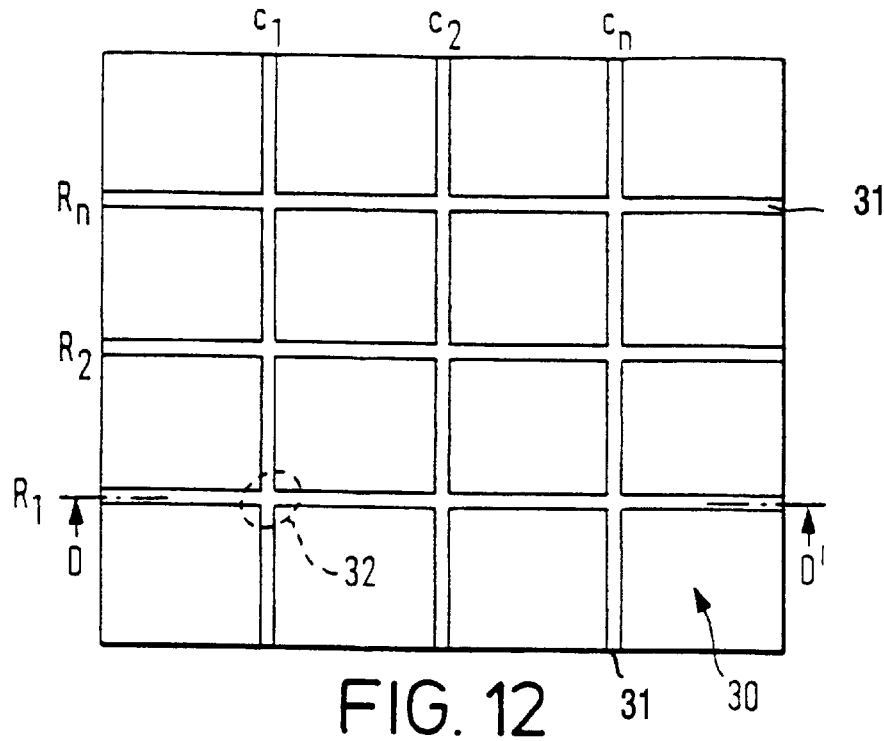
FIG. 12 illustrates planar waveguides in accordance with the invention arranged in a matrix on a common substrate.
Figure 13:
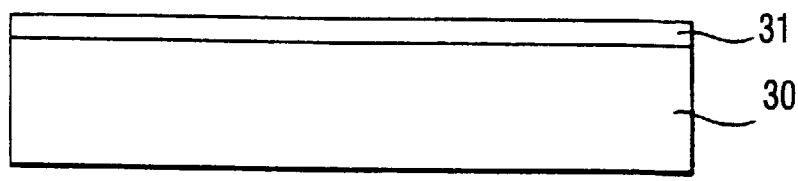
FIG. 13 is a sectional view taken along D–D' shown in FIG. 12.

Whilst the invention has been described hitherto in connection with optical fibres, it has application to other waveguides that have a core region of a first refractive index and a surrounding cladding region of a second different refractive index, configured to produce guiding of optical radiation. FIGS. 12 and 13 show an alternative configuration in which the waveguides consist of tracks on a substrate. A silica, optically transparent substrate 30 is doped on its upper surface with Ge:B through a mask (not shown) to provide a rectangular matrix pattern of optically conductive tracks 31, arranged in rows and columns $C_n$, $R_n$. The refractive index difference Δn between the tracks 31, the underlying glass substrate 30 and the overlying air, produces guiding of light along the rows and columns. Selective connection and disconnection between intersecting rows and columns can be achieved by exposing the substrate selectively to ultraviolet radiation. For example, when it is desired to disconnect the connection between row $R_1$ and colum $C_1$, u.v. radiation at 244 nm is directed onto the substrate transversely e.g. from a laser source in order to expose selectively region 32. In this way, the refractive index of the photosensitive layer 32 in the region of the intersection of the row and column, is raised to a sufficient level that the cladding material 31 no longer acts as a guide and light is dissipated in region 32, when travelling along the row $R_1$ or column $C_1$. The device shown in FIG. 12 can thus be used as a programmable logic array for optical signals.

Figure 14:
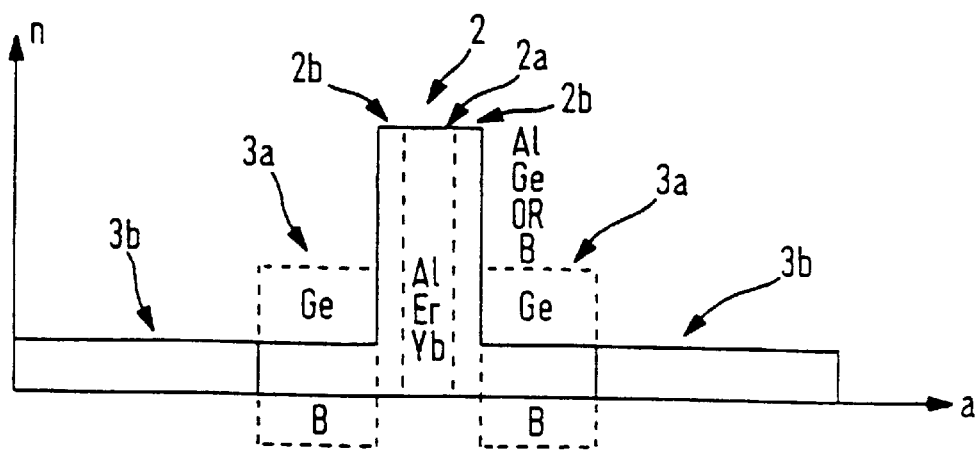
FIG. 14 is an illustration of the transverse refractive index profile of another example of an optical fibre in accordance with the invention.

Referring now to FIG. 14, another example of an optical fibre in accordance with the invention is shown, which can be considered as a modification of the configuration shown in FIG. 4 and like regions are marked with the same reference numbers. The silica fibre consists of a core 2 with a cladding 3 having an inner cladding region 3a which is photosensitive as a result of being co-doped with B:Ge in the manner described previously. The region 3a in the absence of exposure to u.v. light has a refractive index which corresponds to that of the outer cladding region 3b, which is not doped to be photosensitive. In the fibres previously described, the core may be doped with Al or P in order to raise its refractive index. The core may alternatively be doped with Ge and/or B to achieve photosensitivity. However, this cannot be achieved if it is desired to dope the core with Yb or Er in order to achieve optical activity, because as previously described, it is not possible to use Ge or B in combination with a rare earth dopant in order to achieve photosensitivity in the core. The arrangement of FIG. 14 provides a solution to this problem.

In FIG. 14, the core 2 is arranged as an inner core region 2a surrounded by an outer core region 2b. The inner core region 2a may be doped with a rare earth element such as Er or Yb and may additionally include Al to raise the refractive index further. The outer core region 2b is doped with Ge and/or B so as to be photosensitive. Thus, with this arrangement, refractive index gratings may be written in both the inner region 3a of the cladding and the outer region 2b of the core.

Figure 16A:
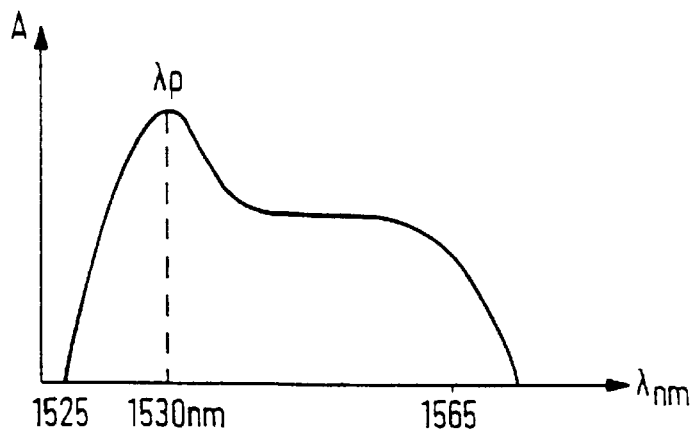
FIG. 16a is a graph of the wavelength response of the optical cavity shown in FIG. 15a, in the absence of the blazed grating shown in FIG. 15c.

Referring now to FIGS. 15 and 16, an optical fibre laser is shown, in which a resonant cavity is formed between first and second refractive index gratings 33, 34 formed in an optical fibre 35. The fibre corresponds to fibre 1 shown in FIG. 2b and has a core 2 surrounded by a photosensitive inner cladding region 3a, and a non-photosensitive outer cladding region 3b. The gratings 33, 34 are shown in more detail in FIGS. 15b and 15d respectively. Grating patterns g1 and g2 are recorded in the inner cladding regions 3a in a manner described previously with reference to FIG. 7 or in any of the other well known methods e.g. described in Kashyap et al supra. The core of the fibre 35 is doped with a rare earth element such as Yb or Er so as to render it optically active. The core 2 is non-photosensitive.

Figure 16B:
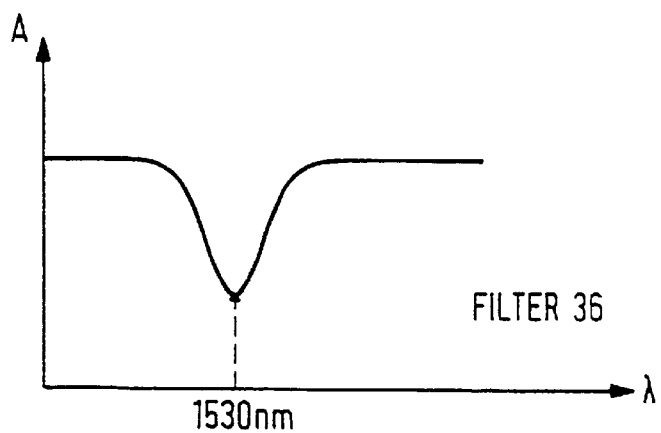
FIG. 16b is a graph of the wavelength response of the blazed grating shown in FIG. 15c.
Figure 16C:
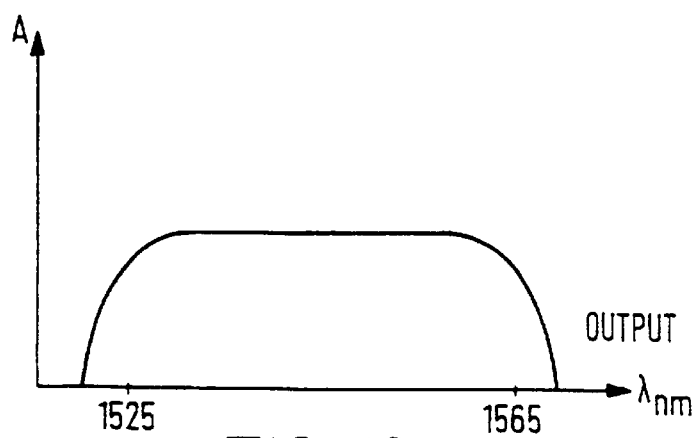

The fibre 35 also includes a blazed grating which has a lossy wavelength characteristic which is shown in more detail in FIG. 16b. The blazed grating 36 is shown in more detail in FIG. 15c and includes a blazed refractive index pattern g3 recorded in the inner cladding region 3a of the fibre, but not substantially in the core or the outer cladding region.

The fibre is pumped by laser radiation at 1480 nm (or 980 nm) from a pump laser 38 connected through a conventional fused fibre coupler 39 to the fibre 35.

The gratings 33, 34 have a spatial periodicity chosen to produce resonance for signals fed from a laser 40 into the fibre. The nominal operating wavelength of laser 40 in this example is 1530 nm The wavelength characteristic of the cavity, in the absence of the blazed grating 36 is shown in FIG. 16a and it will be seen that the characteristic includes an undesirable peak at the centre wavelength of laser 40, namely 1530 nm. The characteristics of the blazed grating 36 are selected so its lossy peak is 1530 nm so that the effect of the filter is to suppress the gain peak shown in FIG. 16a. The resulting output at end 41 of the fibre is shown FIG. 16c, from which it can be seen that the blazed grating 36 suppresses the peak that otherwise would occur at 1530 nm.

It will be seen that the gratings shown in FIG. 15a are all recorded in the optically active fibre. The gratings can be recorded in the inner cladding region 3a, with the result that there are no splices. In contrast, in the prior art, the optically active fibre needed to be spliced to conventional germanosilicate fibres because it was not possible easily to record that the gratings in the optically active fibre itself.

The optical activity of the core region of the fibres according to the invention need not necessarily be produced by dopants. For example, as shown in FIG. 17, the fibre may comprise a tubular member 42 made of Ge:B doped silica glass, which provides the photosensitive cladding region, filled with an optically nonstative liquid or colloid 43, which provides the core region. A refractive index gating may be recorded in the cladding region 42, in the manner described with reference to FIG. 6. More details of this hollow fibre construction can be found in our PCT/GB95/02322. Examples of nonstative materials which can be used to form the core 43 are liquid crystals which exhibit a variable refractive index as a function of an applied electric field, liquids which exhibit the Kerr effect, nitrobenzene and colloidal suspensions of quantum dots. The Ge doping in the glass tube 42 may be a radially inner region only, as indicated by the dotted line 44, in a similar fashion to that described with reference to FIGS. 2 and 4.

Many other modifications and variations fall within the scope of the invention. For example the core region may include nonstative poled material which exhibits a dipole moment, which is responsive to an applied electric field. Reference is directed to L. Li & D. N. Payne "Permanently-Induced Linear Electro-Optic Effect in Silica Optical Fibres, Dig. Conf. Integrated and Guided Wave Optics, 1989 OSA, Paper TuAA2-1 (1989) and T. Fujiwara, D. Wong, Y. Zhao, S. Fleming, V. Grishina & S. Poole, "UV-Excited Poling and Electrically Tunable Bragg Gratings in a Germanosilicate Fibre", Postdeadline Paper OFC '95 (Feb '95). The fibre may be provided with an electrode arrangement to apply an electric field to the poled material in the core region to control its optical characteristics. Reference is directed to EP 96300638.2.

In another modification, the cladding region includes concentric regions of photosensitive material spaced by concentric regions relatively low photosensitivity.

As used herein, the term optical radiation includes both visible and non-visible radiation including infra-red and ultra-violet radiation.

What is claimed is:

1. An optical waveguide comprising:
a core region and a cladding region, the refractive index of said core region being higher than that of said cladding region,
said cladding region including a photosensitive material which renders said refractive index of said cladding region photosensitive at least within a given wavelength range;
said waveguide further including a refractive index diffraction grating disposed only in said cladding region.

2. An optical waveguide as in claim 1 wherein:
said core region includes either (i) an optically active material which can be excited into states for producing optical amplification or lasing action, or (ii) optically non-linear material that has a refractive index which varies transiently in a non-linear manner as a function of an applied electric ac or dc field or optical radiation.

3. An optical waveguide as in claim 2 wherein the core material exhibits a lower photosensitivity than the cladding material within said wavelength range.

4. An optical waveguide as in claim 2 wherein:
the cladding includes first and second different dopant materials which render the cladding material photosensitive and which respectively reduce and increase the refractive index thereof,
whereby in the absence of exposure to light in said wavelength range, the refractive index of the cladding assumes a base level less than that of the core material, and upon exposure to light in said wavelength range the refractive index of the exposed material of the cladding region changes from said base level.

5. An optical waveguide as in claim 4 wherein the refractive index of the photosensitive cladding region increases when exposed to light in said wavelength range.

6. An optical waveguide as in claim 4 wherein the first and second dopant materials for the cladding comprise B and Ge.

7. An optical waveguide as in claim 2 wherein the core comprises Al or P.

8. An optical waveguide as in claim 7 wherein optical activity in the core is produced by a dopant comprising a rare earth dopant.

9. An optical waveguide as in claim 8 wherein the rare earth dopant comprises Yb or Er.

10. An optical waveguide as in claim 1 wherein both the core and the cladding regions have a photosensitive refractive index.

11. An optical waveguide as in claim 1 wherein the cladding includes a first relatively photosensitive region and a second relatively non-photosensitive region.

12. An optical waveguide as in claim 11 wherein the first and second regions have the same refractive index prior to exposure of the first region to light to which it is photosensitive.

13. An optical waveguide as in claim 1 wherein the core and cladding comprise silica glass.

14. An optical waveguide as in claim 1 wherein the material of the core region includes an optically active liquid.

15. An optical waveguide as in claim 14 wherein the optically active liquid comprises nitrobenzene.

16. An optical waveguide as in claim 15 wherein the optically active liquid comprises liquid crystal material.

17. An optical waveguide as in claim 1 wherein the grating is a blazed grating.

18. An optical waveguide as in claim 1 wherein the core includes an inner region which is relatively non-photosensitive to light at a given wavelength, surrounded by an outer region which is relatively photosensitive to light at said given wavelength.

19. An optical amplifier including an optical waveguide as in claim 1 with a refractive index grating formed in the cladding region thereof.

20. An amplifier as in claim 19 wherein the grating forms part of a resonant cavity for producing lasing amplification.

21. An amplifier as in claim 20 including a blazed refractive index grating in the cladding region of the waveguide for modifying the wavelength resonant characteristic of the cavity.

22. Spliced waveguides including at least one waveguide as in claim 1, each waveguide including:

core and cladding regions for guiding optical radiation in respective transmission mode configurations, the cladding region of a first waveguide having a refractive index which varies along the length of the first waveguide adjacent a splice so as to match the transmission mode configuration of the first waveguide to that of a second waveguide, said second waveguide being as in claim 31.

23. Spliced waveguides as in claim 22 wherein the cladding region of the first waveguide is photosensitive.

24. Spliced waveguides as in claim 22 wherein the first waveguide has a transverse core dimension which is less than that of the second waveguide, the core of the first waveguide being doped with a rare earth element to render it optically active.

25. Spliced waveguides as in claim 24 wherein the second waveguide includes a refractive index grating that is a blazed grating.

26. An optical waveguide as in claim 1 comprising an optical fibre.

* * * * *